Inventor:
Oliver C. Traver,
by Harry E. Dunlap
His Attorney.

Patented Aug. 10, 1937

2,089,719

UNITED STATES PATENT OFFICE 2,089,719

CONTROL OF ELECTRIC SWITCHES

Oliver C. Traver, Drexel Hill, Pa., assignor to General Electric Company, a corporation of New York Application May 8, 1936, Serial No. 78,638

11 Claims. (Cl. 175—294)

My invention relates to improvements in the control of electric switches and more particularly to circuit breakers and especially high-speed circuit breakers controlled by high speed relays. An object of my invention is to provide an improved switch control arrangement whereby at will and with only a single control source, any one of a plurality of switches can be opened independently of the others, and under abnormal circuit conditions all of the switches can be opened substantially simultaneously by a single contact switching means.

In the control of high-voltage high-capacity circuits, such as the lines extending from Boulder Dam, speed in interruption under fault conditions is paramount. Where a line is connected to two or more circuits, such as station buses, it is frequently desirable to disconnect the line from one or more buses, but in case of a fault on a line, it is necessary to disconnect the line from all the buses at the station. If two or more control sources were available or high-speed fault-responsive relays could be supplied with two or more separately insulated contact means or if an auxiliary relay controlled by the fault-responsive relays could be used, this differentiation in disconnection would be relatively simple. But control sources, especially where direct current is used, are costly initially as well as in maintenance, so the usual station, even of importance, is provided with only one. The addition of contacts besides the one usually furnished on high-speed highly sensitive relays results in difficulties, such as reduction in sensitivity, increase in time of operation, unsatisfactory insulation, and contact bouncing. The use of an auxiliary relay adds to the over-all tripping time, thus sacrificing some of the advantages gained by the use of high-speed circuit breakers and relays. In order to avoid the difficulties outlined and the necessity for more than one control source, I provide, in accordance with my invention, means whereby with only a single control source the line can be disconnected from any bus at will and yet in case of a fault be disconnected from all buses with only a single contact means on the protective relays.

My invention will be better understood from the following description when considered in connection with the accompanying sheet of drawings, and its scope will be pointed out in the appended claims.

Figure 1:
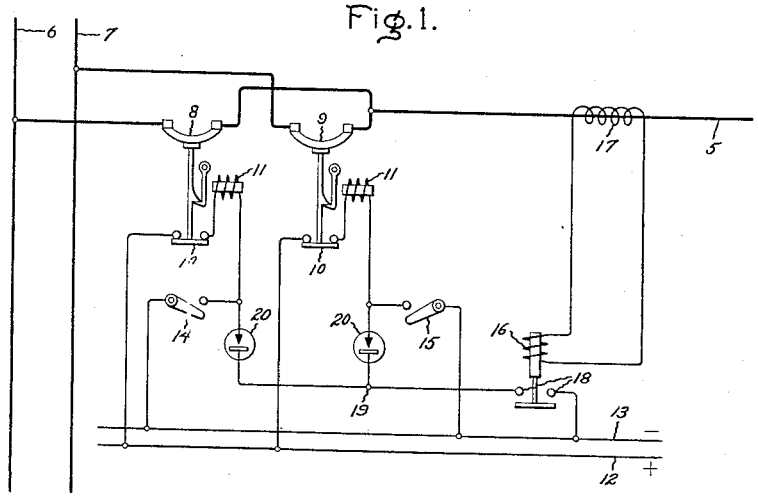
Figure 2:
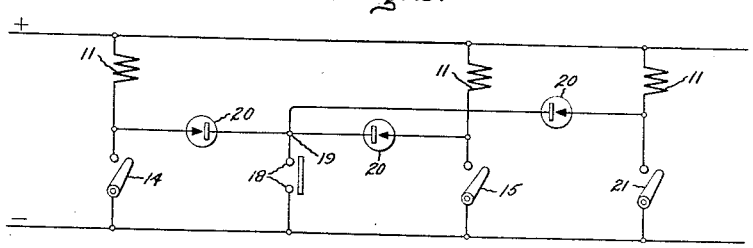
Figure 3:
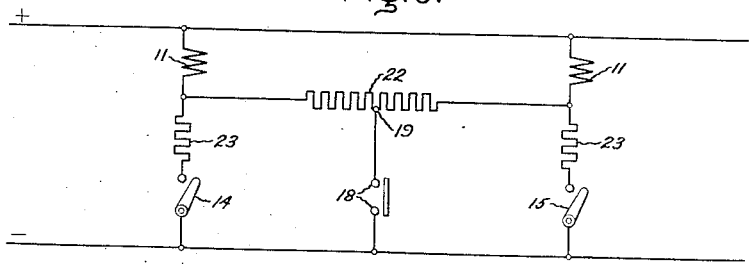

In the accompanying sheet of drawings, Fig. 1 illustrates diagrammatically an embodiment of my invention as applied to the control of two circuit breakers for connecting an electric power line to two circuits; Fig. 2 is an across-the-line diagram of the embodiment of my invention shown in Fig. 1 as applied to the operation of three circuit breakers; and Fig. 3 is an across-the-line diagram illustrating a modification of the embodiment of my invention shown in Fig. 1.

In the embodiment of my invention illustrated in Fig. 1, a circuit such as a power line 5, shown single phase for simplicity, is arranged to be connected to two other circuits such as station buses 6 and 7 through suitable interrupting means such as latch closed circuit breakers 8 and 9, respectively. Each circuit breaker is illustrated as having an auxiliary switch 10 which is closed when the circuit breaker is closed and suitable tripping means such as a trip coil 11. For energizing the trip coils, there is provided a suitable source indicated as direct current control buses 12 and 13.

In order to effect energization of the trip coils of the circuit breakers 8 and 9 at will so as to open but one circuit breaker at a time, there are included in the circuits of the trip coils 11 suitable individual switching means such as manually or otherwise operated switches 14 and 15, respectively. For energizing the trip coils 11 so that all the circuit breakers can be opened in response to abnormal line conditions, there is illustrated a single contact protective relay switching means, shown for simplicity as an over-current relay 16, which is connected to be energized from the line 5 through suitable means such as a current transformer 17. The control circuits of the trip coils 11 are connected to a common point 19 and thence to the switching means 18 so as to be in parallel on the control buses 12, 13.

With this arrangement, it will be observed that the closing of either of the control switches 14 or 15 would result in completing the circuits of both of the trip coils 11 and thus make it impossible to open only one circuit breaker at a time. In order to avoid this, I provide, in accordance with my invention, suitable means 20 between the control switches 14 and 15 and the single contact switching means 18 which will prevent sufficient flow of current through the interconnection between the trip coils by way of the common point 19 to cause the tripping operation of both trip coils when either of the control switches 14 or 15 is closed and the switching means 18 remains open. The means 20 may be any suitable current limiting means and more particularly may be unilaterally conducting means such as suitable rectifiers. For example, copper oxide rectifiers may be used. If rectifiers are used, then they are so arranged that the closing of the switching means 18 will permit flow of current from one side of the control bus through the trip coils 11 to the other side of the control bus but if one of the control switches is closed, one of the rectifiers will oppose flow of current in the connection between the trip coil circuits through the common point 19. While I have shown a direct current control source, my invention obviously is not so limited, because it can be used with an alternating current source. This will be readily apparent from Fig. 1, since current in the connection between the trip coils would be effectively blocked because the rectifiers 20 are opposed to each other.

In the embodiment of my invention shown in Fig. 2, three trip coils 11 are shown with control switches 14, 15 and 21. From a point in each control circuit between the trip coil and the control switch a connection to a common point 19 is made through suitable current limiting means again illustrated as unilaterally conducting devices 20. From Fig. 2, it will be observed that the closing of the single contact switching means 18 effects the energization of all of the trip coils. However, if any control switch, such, for example, as 15, is closed, it will complete the circuit of only the corresponding trip coil 11 because any tendency for current to flow from this control circuit to the other trip coils will be blocked by the rectifier immediately connected between this control circuit and the common point 19 of all the control circuits.

In the embodiment of my invention shown in Fig. 3, the means for preventing the energization of all of the trip coil circuits when any control switch 14 or 15 is closed is illustrated as a suitable resistance 22, an intermediate point of which is connected to the common point 19. The value of the resistance 22 is such that when either control switch 14 or 15 is closed, insufficient current will pass through the resistor to energize the trip coil on the far side of the resistor from the control switch which is closed. A further requirement of the resistor is that the part of it each side of the common point 19 will, upon closing of the switching means 18, pass sufficient current to effect the tripping energization of both trip coils. If it is desired to insure substantially the same current flow in the trip coils whether they are energized by closing the control switches or by the single contact switching means 18, a resistance 23 may be connected in circuit with each trip coil, as shown. Assuming equal trip coil resistances, then the common point 19 may be at the midpoint of the resistance 22, and each of the resistances 23 may be equal to half the value of the resistance 22.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination, a plurality of circuit interrupters, a trip coil for each circuit interrupter, a source of current for energizing said trip coils, means including a single contact switching means for directly and simultaneously connecting all of said trip coils to said source in parallel, individual switching means for connecting each trip coil to said source, and means for preventing the energization of any other trip coil when the individual switching means for one trip coil is energized.

2. In combination, two electric circuits, an electric power line, two circuit interrupters for respectively connecting said circuits to said line, a trip coil for each circuit interrupter, a source of control current, means for energizing the trip coil of each circuit interrupter from said source independently of the trip coil of the other circuit interrupter, and a single contact fault-responsive relay means for directly effecting the simultaneous energization of both the trip coils from said source.

3. In combination, two electric circuits, an electric power line, two circuit interrupters for respectively connecting said circuits to said line, a trip coil for each circuit interrupter, a source of control current for energizing said trip coils, means including a single contact switching means for directly and simultaneously connecting both of said trip coils to said source in parallel, individual switching means for connecting each trip coil to said source, and unilateral conducting means for preventing the energization of both trip coils when the individual switching means for one trip coil is energized.

4. In combination, two electric circuits, an electric power line, two circuit interrupters for respectively connecting said circuits to said line, a trip coil for each circuit interrupter, a source of control current for energizing said trip coils, means including a single contact switching means for directly and simultaneously connecting both of said trip coils to said source in parallel, individual switching means for connecting each trip coil to said source, and current limiting means for preventing the energization of both trip coils when the individual switching means for one trip coil is energized.

5. In combination, a plurality of electric circuits, an electric power line, a plurality of circuit interrupters for respectively connecting said circuits to said line, tripping means for each circuit interrupter, and means for controlling the opening of said circuit interrupters, including a single source of tripping current, a single contact means for simultaneously connecting all of said tripping means in parallel to said source, and means for connecting each of said tripping means to said source independently of the other tripping means.

6. In combination, two electric circuits, an electric power line, two circuit interrupters for respectively connecting said circuits to said line, a control circuit for each circuit interrupter, a single source of direct current for energizing said control circuits, individual switching means for connecting each control circuit to said source, a connection from each control circuit to a common point, switching means between said common point and one side of said source for completing said circuits simultaneously, and unilateral conductive means in said connections for preventing the energization of both control circuits when one of said individual switching means is closed.

7. In combination, a plurality of circuit interrupters, means for controlling the opening of said circuit interrupters, including a source of tripping current, a control circuit for each circuit interrupter, means for connecting each control circuit to said source independently of the other control circuit, and a single contact means for simultaneously connecting all of said control circuits to said source.

8. In combination, a plurality of circuit breakers, tripping means for each circuit breaker, a source of current for energizing said tripping means, a control circuit for each tripping means, switching means in each control circuit between the tripping means and one side of said source, connections from a point between each tripping means and the switching means of the corresponding control circuit to a common point, switching means between said common point and said one side of said source, and means in said connections for preventing the energization of more than one tripping means when the switching means in the control circuit of said one tripping means is closed.

9. In combination, a plurality of circuit breakers, tripping means for each circuit breaker, a source of current for energizing said tripping means, a control circuit for each tripping means, switching means in each control circuit between the tripping means and one side of said source, connections from a point between each tripping means and the switching means of the corresponding control circuit to a common point, switching means between said common point and said one side of said source, and unilateral current limiting means in said connections for preventing the energization of more than one tripping means when the switching means in the control circuit of said one tripping means is closed.

10. In combination, a plurality of electric circuits, an electric power line, a plurality of circuit breakers for respectively connecting said circuits to said line, tripping means for each circuit breaker, a source of direct current for energizing said tripping means, a control circuit for each tripping means, switching means in each control circuit between the tripping means and one side of said source, connections from a point between each tripping means and the switching means of the corresponding control circuit to a common point, switching means between said common point and said one side of said source, and unilateral conducting means in said connections for preventing the energization of all of the tripping means when the switching means in one control circuit is closed.

11. In combination, a plurality of electromagnetic devices to be operated, a single source of current for energizing said devices, means for controlling the energization of said devices including a single contact means for simultaneously connecting all of said devices in parallel to said source, and means for connecting each of said devices to said source independently of the other devices.

OLIVER C. TRAVER.